(12) United States Patent
Tanaka et al.

(10) Patent No.: US 6,822,607 B2
(45) Date of Patent: Nov. 23, 2004

(54) COMMUNICATION APPARATUS USING OFDM TECHNIQUE

(75) Inventors: Makoto Tanaka, Obu (JP); Kazuoki Matsugatani, Kariya (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 10/292,244

(22) Filed: Nov. 11, 2002

(65) Prior Publication Data

US 2003/0090419 A1 May 15, 2003

(30) Foreign Application Priority Data

Nov. 12, 2001 (JP) ........................................ 2001-346246

(51) Int. Cl.$^7$ .............................. H01Q 3/00; G01S 3/16
(52) U.S. Cl. ........................ 342/377; 342/383; 370/343
(58) Field of Search ................................ 342/378, 383, 342/377; 370/343

(56) References Cited

U.S. PATENT DOCUMENTS

| | | | | |
|---|---|---|---|---|
| 5,495,256 A | * | 2/1996 | Piper ........................... | 342/195 |
| 6,249,250 B1 | * | 6/2001 | Namekata et al. ............ | 342/372 |
| 6,496,144 B2 | * | 12/2002 | Tanaka et al. ............... | 342/378 |
| 6,603,427 B2 | * | 8/2003 | Cai et al. ..................... | 342/378 |
| 2002/0085653 A1 | * | 7/2002 | Matsuoka et al. ........... | 375/347 |
| 2002/0196734 A1 | * | 12/2002 | Tanaka et al. ............... | 370/210 |

FOREIGN PATENT DOCUMENTS

| | | |
|---|---|---|
| JP | 2000-174536 | 6/2000 |
| JP | 2000-209017 | 7/2000 |

OTHER PUBLICATIONS

Olfat, Masoud et al, "Low Complexity Adaptive Beamforming and Power Allocation for OFDM Over Wireless Networks," IEEE International Conf. on Communications, Jun. 1999, pp523–527, vol. 1.*

Li, Ye (Geoffrey), "Pilot–Symbol–Aided Channel Estimation for OFDM in WIreless Systems," IEEE 49th vehicular Technology Conference, Jul. 1999, pp 1131–1135, vol. 2.*

* cited by examiner

*Primary Examiner*—Gregory C. Issing
(74) *Attorney, Agent, or Firm*—Harness, Dickey & Pierce, PLC

(57) ABSTRACT

A weight computation unit finds a weight used in a maximum ratio combining carried out on data sub-carrier signals for each user terminal. A direction vector computation unit finds direction vectors on the basis of the weight. A user separation weight computation unit finds a user separation vector on the basis of the direction vectors. A user separation combining unit uses the user separation vector to well separate a data sub-carrier signal transmitted by a predetermined terminal from data sub-carrier signals received from all terminals.

9 Claims, 6 Drawing Sheets

FIG. 4

$$W = \begin{Bmatrix} \dfrac{h_1(1)}{|h_1(1)|^2} & \dfrac{h_1(2)}{|h_1(2)|^2} & \dfrac{h_1(3)}{|h_1(3)|^2} & \dfrac{h_1(4)}{|h_1(4)|^2} \\ + \\ \dfrac{h_2(1)}{|h_2(1)|^2} & \dfrac{h_2(2)}{|h_2(2)|^2} & \dfrac{h_2(3)}{|h_2(3)|^2} & \dfrac{h_2(4)}{|h_2(4)|^2} \\ + \\ \dfrac{h_3(1)}{|h_3(1)|^2} & \dfrac{h_3(2)}{|h_3(2)|^2} & \dfrac{h_3(3)}{|h_3(3)|^2} & \dfrac{h_3(4)}{|h_3(4)|^2} \\ + \\ \dfrac{h_4(1)}{|h_4(1)|^2} & \dfrac{h_4(2)}{|h_4(2)|^2} & \dfrac{h_4(3)}{|h_4(3)|^2} & \dfrac{h_4(4)}{|h_4(4)|^2} \end{Bmatrix}$$

$$= \begin{Bmatrix} A_{11}\exp(j*\theta_{11}) & A_{12}\exp(j*\theta_{12}) & A_{13}\exp(j*\theta_{13}) & A_{14}\exp(j*\theta_{14}) \\ A_{21}\exp(j*\theta_{21}) & A_{22}\exp(j*\theta_{22}) & A_{23}\exp(j*\theta_{23}) & A_{24}\exp(j*\theta_{24}) \\ A_{31}\exp(j*\theta_{31}) & A_{32}\exp(j*\theta_{32}) & A_{33}\exp(j*\theta_{33}) & A_{34}\exp(j*\theta_{34}) \\ A_{41}\exp(j*\theta_{41}) & A_{42}\exp(j*\theta_{42}) & A_{43}\exp(j*\theta_{43}) & A_{44}\exp(j*\theta_{44}) \end{Bmatrix}$$

$$P = [P(1) \;\; P(2) \;\; P(3) \;\; P(4)]$$

USER 1 ⟶ [P(1) P(2)]  
USER 2 ⟶ [P(3) P(4)]

$$P(k) = \sum_{i=1}^{4} |h_i(k)|^2$$

P' FOR USER 1 = [P(1)  P(3)]

P'' FOR USER 2 = [P(2)  P(4)]

$$\begin{pmatrix} \frac{h_1(k)}{\sum_k |h_1(k)|^2} \\ \frac{h_2(k)}{\sum_k |h_2(k)|^2} \\ \frac{h_3(k)}{\sum_k |h_3(k)|^2} \\ \frac{h_4(k)}{\sum_k |h_4(k)|^2} \end{pmatrix} = \begin{pmatrix} B_1 \exp(j*\phi_1) \\ B_2 \exp(j*\phi_2) \\ B_3 \exp(j*\phi_3) \\ B_4 \exp(j*\phi_4) \end{pmatrix}$$

PHASE → $T = \begin{pmatrix} \exp(j*\phi_1) \\ \exp(j*\phi_2) \\ \exp(j*\phi_3) \\ \exp(j*\phi_4) \end{pmatrix}$ AMPLITUDE PHASE → $K = \begin{pmatrix} B_1 \exp(j*\phi_1) \\ B_2 \exp(j*\phi_2) \\ B_3 \exp(j*\phi_3) \\ B_4 \exp(j*\phi_4) \end{pmatrix}$

K= ⇦ ADD ELEMENTS OF COLUMNS 1 AND 3

COMMUNICATION APPARATUS USING OFDM TECHNIQUE

CROSS REFERENCE TO RELATED APPLICATION

This application is based on and incorporates herein by reference Japanese Patent Application No. 2001-346246 filed on Nov. 12, 2001.

BACKGROUND OF THE INVENTION

The present invention relates an OFDM communication apparatus adopting an OFDM transmission technique for dividing data into pieces of data with different frequencies and transmitting the pieces of data completing the frequency division in parallel.

BACKGROUND OF THE INVENTION

In recent years, attention is paid to the SDMA (Space Division Multiple Access) technology for improving a capacity of base station of accommodating user terminals through allocation of a space to a signal received from each of the user terminals by utilizing the directivity of an area antenna in an operation carried out by the base station to receive signals from the user terminals.

According to the SDMA technology, it is necessary to direct a beam in a direction toward a desired user terminal and direct a null point in directions toward user terminals other than the desired user terminal. A null point is a point from and to which no wave is to be received and transmitted. Normally, this technology is implemented by an adaptive array whose algorithm called the MMSE (Minimum Mean Square Error) algorithm is used in many cases.

With this technology, each user terminal adds a known signal determined in advance for each user terminal to a communication signal prior to transmission of the communication signal to a base station. When receiving such a communication signal, the base station determines a weight that minimizes a difference between the known signal added to the communication signal received from the user terminal and its replica, carrying out processing based on the weight.

In this way, a null point is created in a direction toward each of user terminals other than the desired terminal user to suppress communication signals received from the other user terminals. On the other hand, a reception beam is directed in a direction toward a desired one among user terminals in order to acquire a communication signal from the desired user terminal.

In order to apply the MMSE (Minimum Mean Square Error) algorithm to a base station adopting the OFDM technique, it is necessary to add a known signal to a communication signal as described above. There are the following two conceivable methods for adding a known signal to a communication signal.
(I) Insert a known signal in a time-axis direction of a sub-carrier.
(II) Insert a known signal in a frequency-axis direction of the sub-carrier.

A communication signal having such a configuration conforming to the OFDM technique is received by the base station along with a plurality of delay waves. If the delay time of each of the delay waves is found short in comparison with a period of time known as a guard interval in the reception of the communication signal, the base station will be capable of demodulating the communication signal without interferences of other symbols. This function results in two different suppression operations using the adaptive array for the above two conceivable means respectively.

In the case of the method (I) for inserting a known signal in a time-axis direction of a sub-carrier, if the delay time of each delay wave of the communication signal is found short in comparison with the guard interval, the adaptive array will not carry out a suppression operation on the delay waves. This is because, if the delay time of each delay wave of the communication signal is found short in comparison with the guard interval, a data symbol cannot be extracted well. Thus, the freedom of the antenna can be used for effectively suppressing other users. The freedom of the antenna is defined as a number capable of suppressing a signal. The freedom of the antenna is determined by the number of elements composing the antenna. Since the weight can be updated only once by one symbol of the OFDM technique, however, there is raised a problem of a long time it takes to determine a weight.

In the case of method (II) for inserting a known signal in a frequency-axis direction of a sub-carrier, on the other hand, in one operation to update a weight, data as much as sub-carriers can be used so that a weight can be determined within a short period of time. However, a delay wave distorting an OFDM spectrum inevitably becomes a target of suppression even if the delay time of the delay wave is shorter than the guard interval. Thus, a communication signal, which naturally does not have to be suppressed, is suppressed, causing freedom to be expended wastefully. That is, a communication signal, which naturally needs to be suppressed, cannot be suppressed in some cases. As a result, there arises a problem that, for each user terminal, a communication signal cannot be well separated from received signals.

SUMMARY OF THE INVENTION

It is thus an object of the present invention to provide an OFDM-technique communication apparatus capable of well separating a data sub-carrier signal transmitted by a predetermined terminal from data sub-carrier signals transmitted by all terminals.

According to the present invention, a communication apparatus receives communication signals from terminals by adoption of an OFDM technique. In the communication apparatus, the communication signal is received from each of the terminals. A Fourier transform process is performed on a known signal of the communication signal. The known sub-carrier signals are extracted from the communication signal. A Fourier transform process is performed on data signal of the communication signal. Data sub-carrier signals are extracted from the communication signal. A propagation route inference value is inferred for each of the extracted known sub-carrier signals according to the known sub-carrier signals. A combining weight used for carrying out a maximum ratio combining process on the data sub-carrier signals received by each of the antennas according to the inferred propagation route inference value for each of the terminals is found. One of the data sub-carrier signals that has been transmitted by a predetermined one of the terminals from the data sub-carrier signals transmitted by all of the terminals according to the computed combining weight is separated.

BRIEF DESCRIPTION OF THE DRAWINGS

The above and other objects, features and advantages of the present invention will become more apparent from the following detailed description made with reference to the accompanying drawings. In the drawings:

FIG. 4 is an explanatory diagram used for explaining operations carried out by a first embodiment;

FIG. 6 is an explanatory diagram used for explaining operations carried out by a second embodiment implementing a communication apparatus of the invention adopting an OFDM technique.

PREFERRED EMBODIMENT OF THE INVENTION (First Embodiment)

In this embodiment, signals received by a communication apparatus include OFDM signals transmitted by user terminals, that is, terminals of users 1 and 2.

Figures 3A, 3B, 3C:
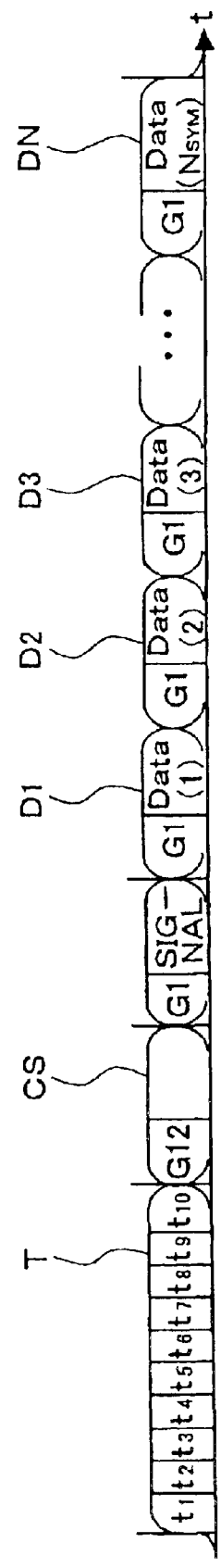
FIGS. 3A, 3B and 3C are diagrams showing a typical format of an OFDM signal.
Figure 5:
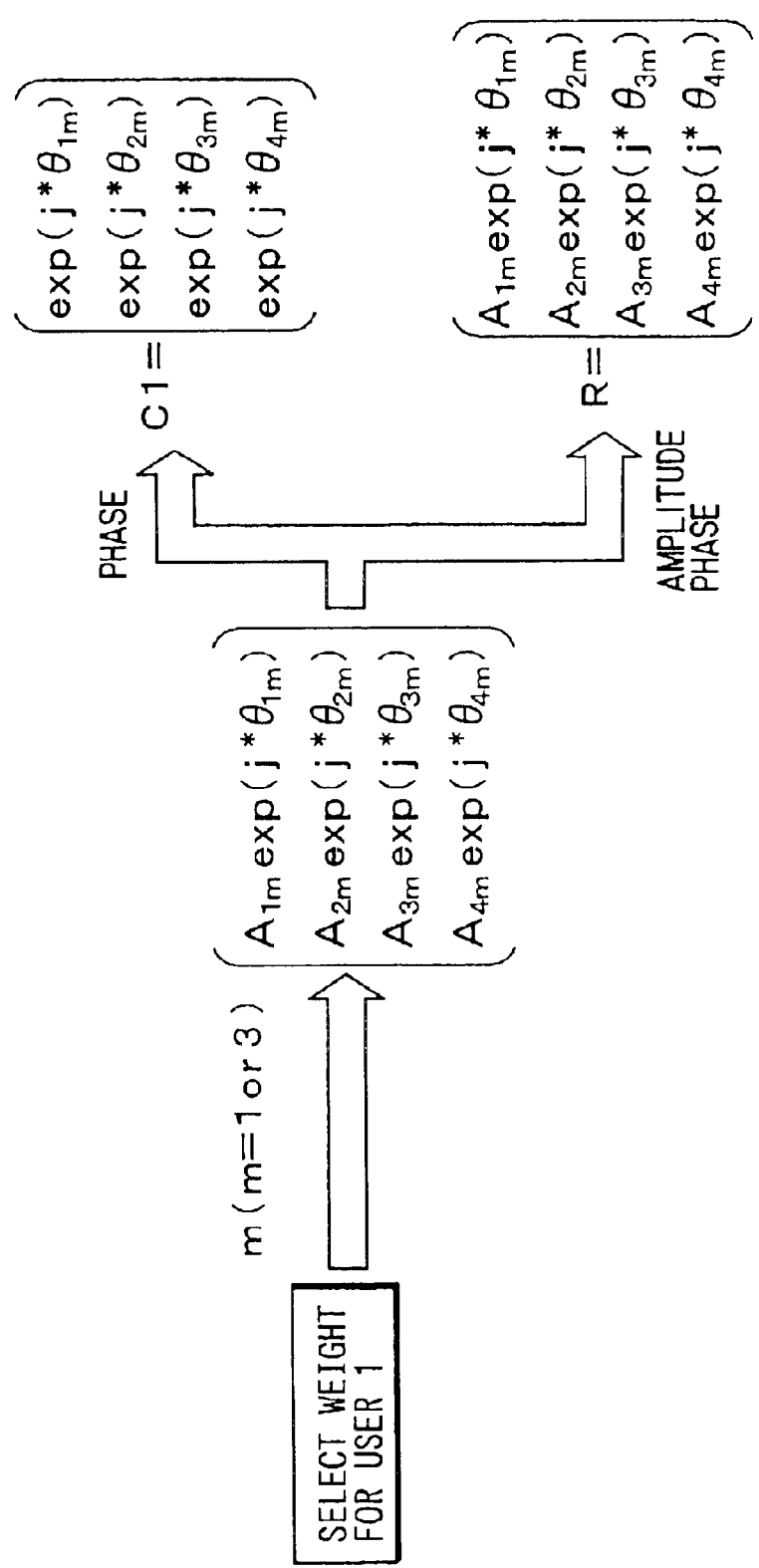
FIG. 5 is an explanatory diagram used for explaining operations carried out by the first embodiment.

As shown in FIG. 3A, an OFDM signal comprises a timing detection known signal T and a propagation route inference known signal CS, which precede valid symbols D1 to DN, where N is an integer, on the time axis (t).

The propagation route inference known signal CS includes known sub-carrier signals S arranged along the frequency axis (f).

Each known sub-carrier signal S shown in FIGS. 3B and 3C is placed on the frequency axis at a position determined in advance for each user terminal. That is, for each user signal, known sub-carrier signals are placed at positions separated from each other.

It is assumed for example that the number of users is 2 (n=2). Let known sub-carrier signals of the terminal of user 1 be S1 and S1' whereas sub-carrier signals of the terminal of user 2 be S2 and S2'. In this case, the sub-carrier signals S1, S2, S1' and S2' are placed at positions corresponding to frequencies f1, f2, f3 and f4, respectively.

The valid symbols D1 to DN include data symbols Data (1) to Data (n) respectively. The valid symbol Di also has a guard interval GI preceding the data symbol Data (i) where i=1 to N. The data symbol Data (i) comprises data sub-carrier signals arranged along the frequency axis.

The data sub-carrier signals are arranged along the frequency axis at positions corresponding to frequencies which are common to all user terminals. That is, along the frequency axis, the data sub-carrier signals of a user terminal overlap the data sub-carrier signals of any other user terminal. As described above, the guard interval GI is provided for each of the data symbols Data (1) to Data (n). The guard interval GI is a copy of a predetermined period on the rear side of the data symbol Data (i) preceded by the guard interval GI.

Figure 1:
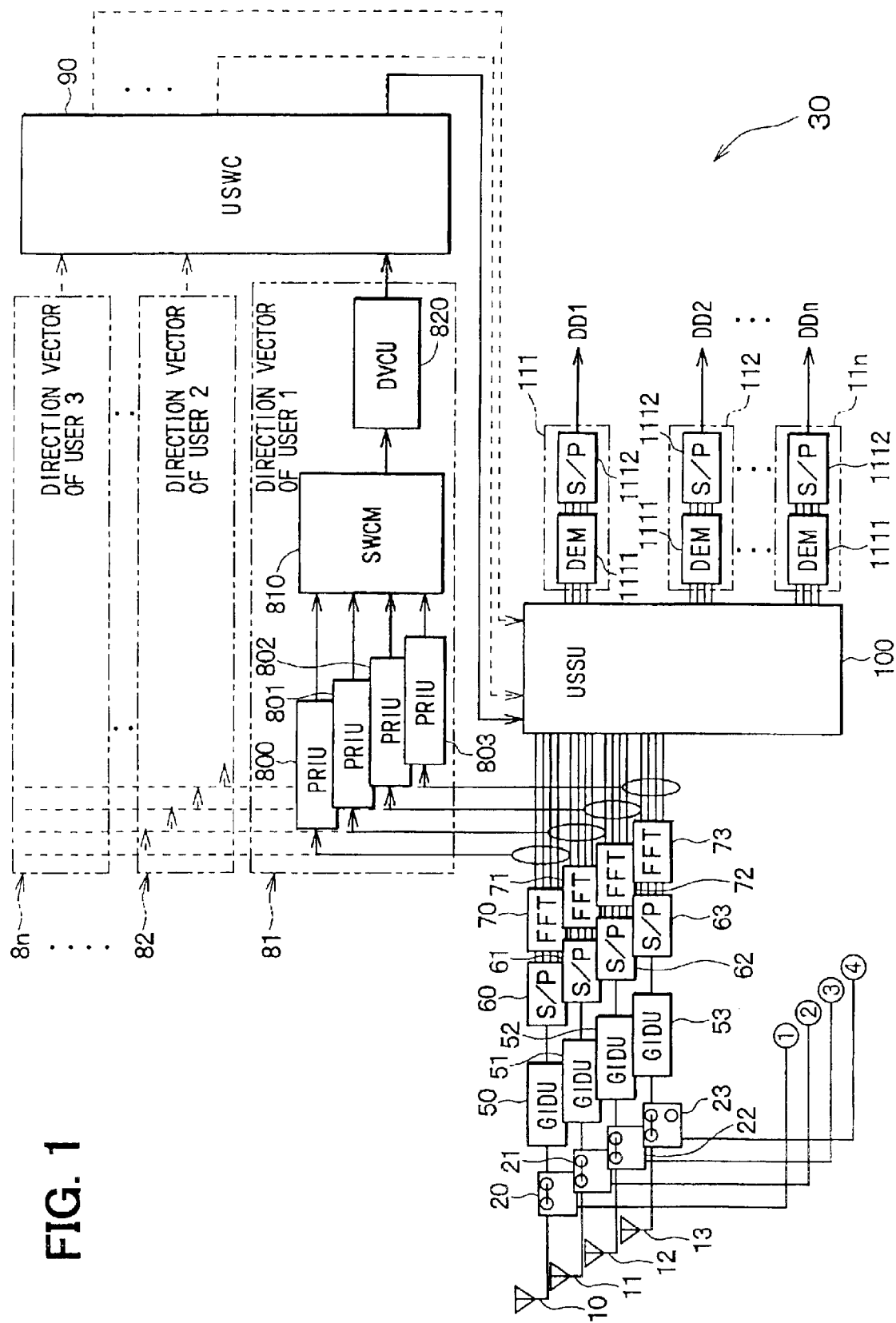
FIG. 1 is a block diagram showing a portion of an electrical circuit configuration of a communication apparatus of the invention adopting an OFDM technique.
Figure 2:
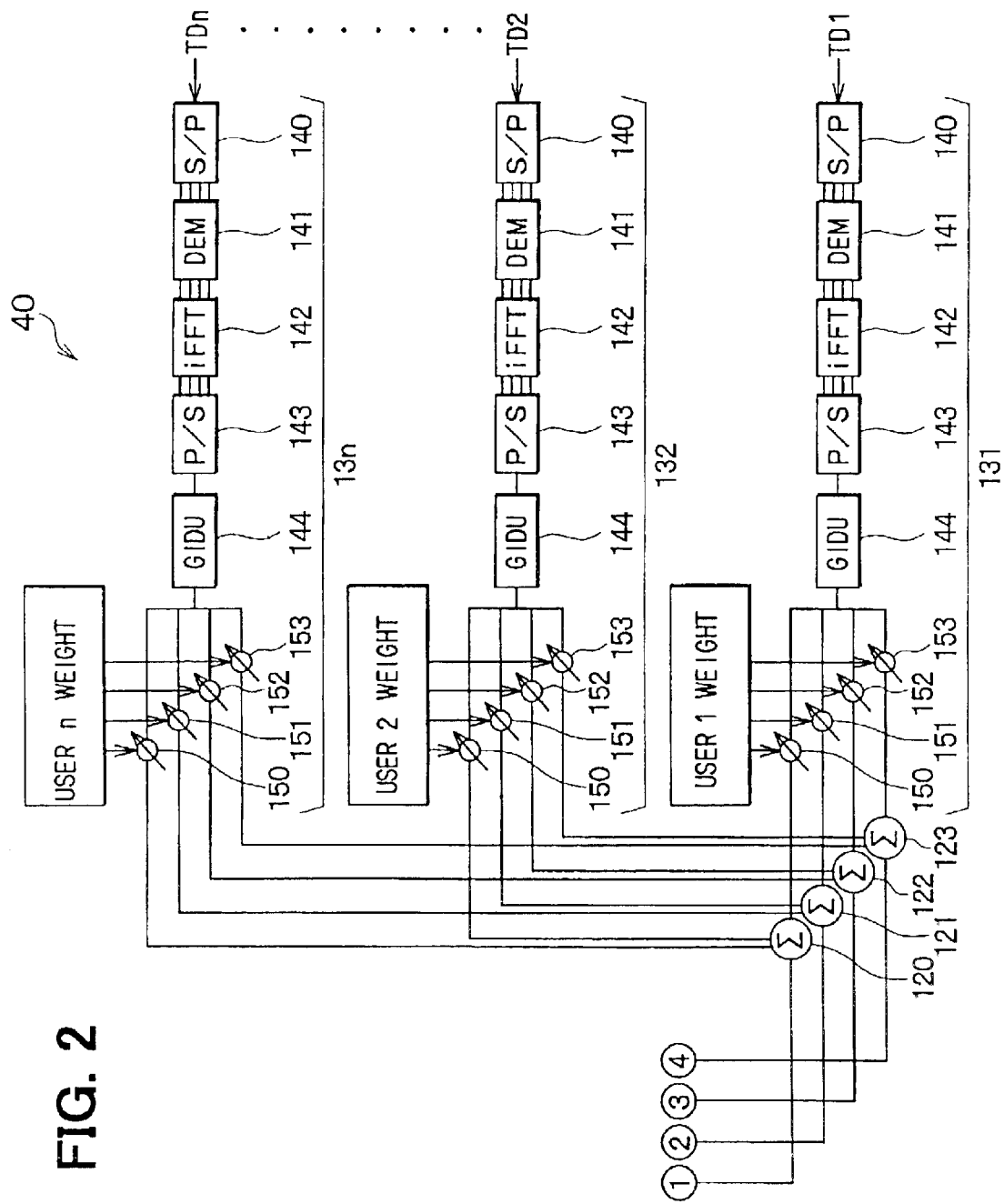
FIG. 2 is a block diagram showing the rest of the electrical circuit configuration of the communication apparatus adopting an OFDM technique.

Next, the configuration of an electrical circuit of the communication apparatus adopting the OFDM technique is explained by referring to FIGS. 1 and 2.

As shown in FIG. 1, the communication apparatus adopting the OFDM technique comprises antennas 10 to 13, switches 20 to 23, a receiver 30 and a transmitter 40. The antennas 10 to 13 receive OFDM signals from terminals of users 1 to n and transmit OFDM signals to the terminals of users 1 to n. The switches 20 to 23 are provided for the antennas 10 to 13, respectively. The switches 20 to 23 connect either the receiver 30 or the transmitter 40 to the antennas 10 to 13, respectively. The switches 20 to 23 also disconnect either the receiver 30 or the transmitter 40 from the antennas 10 to 13, respectively.

The receiver 30 comprises guard interval deletion units (GIDU) 50 to 53 for deleting guard intervals GI, a serial/parallel (S/P) converters 60 to 63, fast Fourier transform (FFT) units 70 to 73, vector generation units 81 to 8n, a user separation weight computation unit (USWC) 90, a user separation combining unit (USSU) 100 and demodulated data generation units 111 to 11n.

As described above, the guard interval deletion units 50 to 53 delete OFDM signals received by the antennas 10 to 13, respectively. The serial/parallel (S/P) converters 60 to 63 carry out serial-to-parallel processing to convert serial signals completing processing including the deletion of guard intervals into parallel signals.

The fast Fourier transform (FFT) units 70 to 73 carry out FFT processing on the parallel signals originated from the antennas 10 to 13 respectively in order perform OFDM demodulation processing on the OFDM signals. Thus, known sub-carrier signals S of the propagation route inference known signal CS can be extracted from the parallel signals. In addition, data sub-carrier signals of each valid symbol can be extracted from the parallel signals.

The vector generation units 81 to 8n are provided for the terminals of users 1 to n, respectively. The vector generation unit 81 comprises propagation route inference units (PRIU) 800 to 803 as inference means, a maximum ratio combining weight computation unit (SWCM) 810 and a direction vector computation unit (DVCU) 820.

The propagation route inference units 800 to 803 are used for storing replicas of a known sub-carrier signal in advance. The propagation route inference units 800 to 803 carry out a complex-division operation on known sub-carrier signals found by the fast Fourier transform (FFT) units 70 to 73, respectively by using the replicas for each of the antennas 10 to 13. In this way, a propagation route inference value can be found for each known sub-carrier signal. The propagation route inference value shows a frequency characteristic of a propagation route between the communication apparatus and each of the user terminals.

The maximum ratio combining weight computation unit (the combining weight computation means) 810 finds a weight W (a combining weight) used in a maximum ratio combining carried out on a data sub-carrier signal of each of the antennas for each user terminal on the basis of the propagation route inference value of each known sub-carrier signal.

As shown in Eq. 1, typically, the weight can be expressed by the following matrix for which the number of antennas (an antenna count) and the number of known sub-carrier signals (a known-sub-carrier-signal count) are each set at 4.

$$W = \begin{pmatrix} \frac{h_1(1)}{|h_1(1)|^2} & \frac{h_1(2)}{|h_1(2)|^2} & \frac{h_1(3)}{|h_1(3)|^2} & \frac{h_1(4)}{|h_1(4)|^2} \\ \frac{h_2(1)}{|h_2(1)|^2} & \frac{h_2(2)}{|h_2(2)|^2} & \frac{h_2(3)}{|h_2(3)|^2} & \frac{h_2(4)}{|h_2(4)|^2} \\ \frac{h_3(1)}{|h_3(1)|^2} & \frac{h_3(2)}{|h_3(2)|^2} & \frac{h_3(3)}{|h_3(3)|^2} & \frac{h_3(4)}{|h_3(4)|^2} \\ \frac{h_4(1)}{|h_41)|^2} & \frac{h_4(2)}{|h_4(2)|^2} & \frac{h_4(3)}{|h_4(3)|^2} & \frac{h_4(4)}{|h_4(4)|^2} \end{pmatrix}$$ [Equation 1]

where hi (k) is a propagation route inference value for the ith antenna and the kth known sub-carrier signal where $1 \leq i \leq 4$ and $1 \leq k \leq 4$. The matrix element is expressed by Equation 2 as follows:

$$\{hi(k)/|hi(k)|^2\}$$ [Equation 2]

As will be described later, the direction vector computation unit (the direction vector computation means) 820 finds a direction vector of the terminal of user 1 on the basis of the weight W. The direction vector is used for directing a reception beam in a direction toward the terminal of user 1. The vector generation units 82 to 8*n* each have the same configuration as the vector generation unit 81.

The user separation weight computation unit 90 finds a user separation weight for the terminal of each user on the basis of direction vectors of the terminals of users 1 to n. A user separation weight is used for separating a data sub-carrier signal transmitted by any user terminal from data sub-carrier signals, which have been transmitted by all user terminals and extracted by the fast Fourier transform units 70 to 73.

The user separation combining unit (the user separation combining means) 100 separates a data sub-carrier signal transmitted by any user terminal from data sub-carrier signals, which have been transmitted by all user terminals and extracted by the fast Fourier transform units 70 to 73, on the basis of the user separation weights.

The demodulated data generation units 111 to 11*n* are provided for users 1 to n, respectively. The demodulated data generation unit 111 has a demodulation unit 1111 and a parallel-serial-conversion unit 1112. The demodulation unit 1111 carries out a digital demodulation process based on typically a BPSK, QPSK or 16QAM technique on the data sub-carrier signal separated by the user separation combining unit 140 for user 1.

The parallel-serial conversion unit 1112 converts a signal obtained as a result of the digital demodulation process into a serial signal in a parallel-serial conversion process in order to obtain demodulated data (DD) transmitted by the terminal of user 1. The demodulated data generation units 112 to 11*n* each have the same configuration as the demodulated data generation unit 111. The demodulated data generation units 112 to 11*n* find modulated data for the terminals of users 2 to n, respectively.

Next, the transmitter 40 is explained by referring to FIG. 2. The transmitter 40 comprises adders (Σ)120 to 123 and data generation units 131 to 13*n*.

The data generation units 131 to 13*n* are provided for the terminals of users 1 to n, respectively. The data generation unit 131 comprises a serial-parallel (S/P) conversion unit 140, a modulation unit 141, an inverse fast Fourier transform (iFFT) unit 142, a parallel-serial (P/S) conversion unit 143, a guard interval (GI) insertion unit 144 and multiplication units 150 to 153.

The serial-parallel (S/P) conversion unit 140 carries out a serial-parallel conversion process on transmission data (TD1) for the terminal of user 1 to generate a parallel signal. The modulation unit 141 carries out a digital modulation process by adoption of a 16QAM, BPSK or QPSK technique to generate modulated data.

The inverse fast Fourier transform (iFFT) unit 142 carries out an inverse fast Fourier transform (iFFT) process on the modulated data produced by the modulation unit 141 to generate a transformed data signal. The parallel-serial (P/S) conversion unit 143 carries out a parallel-serial (P/S) conversion process on the transformed data signal produced by the inverse fast Fourier transform (iFFT) unit 142 to generate a serial signal.

The guard interval (GI) insertion unit 144 inserts guard intervals into the serial signal to produce transmission signals and supplies the transmission signals to the multiplication units 150 to 153 respectively. The multiplication units 150 to 153 are provided for the antennas 10 to 13 respectively. The multiplication units 150 to 153 multiply their respective transmission signals by a user separation weight found by the user separation weight computation unit 90 for user 1 to generate multiplied signals for user 1.

The data generation units 132 to 13*n* each have the same configuration as the data generation unit 131. The data generation units 132 to 13*n* generate multiplied signals for users 2 to n respectively.

Next, the operation of the first embodiment is explained. First of all, the switches 20 to 23 connect respectively the antennas 10 to 13 to the receiver 30. Thus, the antennas 10 to 13 are disconnected from the transmitter 40. In this case, signals received by the antennas 10 to 13 are supplied to the receiver 30 by way of the switches 20 to 23, respectively.

After passing an RF/IF circuit shown in none of the figures, the received signals are subjected to amplification and a frequency conversion process. The signals completing the frequency conversion process are supplied to a vector demodulation unit also shown in none of the figures to be demodulated into a real (I) signal and an imaginary (Q) signal.

By using the I and Q signals as a base, processing required for an OFDM demodulation process is carried out. The processing required for an OFDM demodulation includes a synchronization process, an AFC (Auto Frequency Control) process and a guard interval deletion process carried out by the guard interval deletion units 50 to 53.

The signals completing processing such as the guard interval deletion process are subjected to a serial-parallel conversion process carried out by the serial-parallel conversion units 60 to 63. Parallel signals obtained as a result of the serial-parallel conversion process are supplied to the fast Fourier transform units 70 to 73, respectively.

Receiving the parallel signals, the fast Fourier transform units 70 to 73 extract known sub-carrier signals from the parallel signals and data sub-carrier signals from the parallel signals for each of the antennas. The extracted data sub-carrier signals and the extracted known sub-carrier signals are supplied to the vector generation units 81 to 8*n*.

In the vector generation unit 1, the propagation route inference units 800 to 804 find a propagation route inferred value for each of the known sub-carrier signals. Then, the weight computation unit 50 finds a weight W on the basis of the propagation route inferred values according to Eq. 1. Then, the direction vector computation unit 820 finds a direction vector of the terminal of user 1 on the basis of the weight W as shown in FIG. 4.

Specifically, the direction vector computation unit 820 finds a sum p (k) of denominators of elements in the matrix Equation of the weight W for each column of the matrix as shown in Eq. 3. Then, the direction vector computation unit 820 finds a vector P comprising the sums p (k) found for each column elements thereof as shown in Eq. 4.

$$P(k) = \sum_{i=4}^{4} |h_i(k)|^2 \qquad \text{[Equation 3]}$$

$$P=[p(1), p(2), p(3), p(4)] \qquad \text{[Equation 4]}$$

Furthermore, elements of the vector P for any user terminal are separated from elements of the vector P of other user terminals. Assume for example that the first and third elements of the vector P are associated with a known sub-carrier signal transmitted by the terminal of user 1 whereas the second and fourth elements of the vector P are associated with a known sub-carrier signal transmitted by the terminal of user 2. In this case, the first and third elements are extracted from the vector P to find a vector P' representing a direction toward the terminal of user 1 as shown in Eq. 5.

$$P'=[p(1), p(3)] \qquad \text{[Equation 5]}$$

Then, a maximum value pmax is selected among vectors P'. This is because, by selecting a maximum value among elements, the fact that a highly reliable element can be selected is considerable. The elements of weight W shown in Eq. 1 can each be expressed in terms of a polar coordinate as shown in Matrix (Eq. 6) below. The row of matrices m corresponding to the maximum value pmax is extracted to express a vector R as shown in Eq. 7. A direction vector C1 toward user 1 is then found by eliminating amplitude terms from the Equation of vector R on the right hand side of Eq. 7, leaving only phase terms as shown in Eq. 8.

$$\begin{pmatrix} A_{11}\exp(j*\theta_{11}) & A_{12}\exp(j*\theta_{12}) & A_{13}\exp(j*\theta_{13}) & A_{14}\exp(j*\theta_{14}) \\ A_{21}\exp(j*\theta_{21}) & A_{22}\exp(j*\theta_{22}) & A_{23}\exp(j*\theta_{23}) & A_{24}\exp(j*\theta_{24}) \\ A_{31}\exp(j*\theta_{31}) & A_{32}\exp(j*\theta_{32}) & A_{33}\exp(j*\theta_{33}) & A_{34}\exp(j*\theta_{34}) \\ A_{41}\exp(j*\theta_{41}) & A_{42}\exp(j*\theta_{42}) & A_{43}\exp(j*\theta_{43}) & A_{44}\exp(j*\theta_{44}) \end{pmatrix} \qquad \text{[Equation 6]}$$

$$R = \begin{pmatrix} A_{1m}\exp(j*\theta_{1m}) \\ A_{2m}\exp(j*\theta_{2m}) \\ A_{3m}\exp(j*\theta_{3m}) \\ A_{4m}\exp(j*\theta_{4m}) \end{pmatrix} \qquad \text{[Equation 7]}$$

$$C1 = \begin{pmatrix} \exp(j*\theta_{1m}) \\ \exp(j*\theta_{2m}) \\ \exp(j*\theta_{3m}) \\ \exp(j*\theta_{4m}) \end{pmatrix} \qquad \text{[Equation 8]}$$

If p(1)>p(3), for example, p(1) is selected as the maximum value pmax and column 1 is selected as column m corresponding to the maximum value pmax. Then, a vector R for column 1 and a direction vector C1 are found. If p(1)<p(3), on the other hand, p(3) is selected as the maximum value pmax and column 3 is selected as column m corresponding to the maximum value pmax. Then, a vector R for column 3 and a direction vector C1 are found.

Then, the vector generation units 82 to 8*n* find direction vectors C2 to Cn toward users 2 to n respectively in the same way as the vector generation unit 81. Subsequently, the user separation weight computation unit 90 finds a user separation weight in a direction toward a terminal of each of users 1 to n on the basis of the direction vectors C1 to Cn.

The following description explains a case to find user separation weights W1 and W2 in directions toward terminals of users 1 to n on the basis of the direction vectors C1 to C2 respectively for a user count n of 2.

First of all, direction vectors C1 and C2 are each expressed as a transposed matrix where as a matrix C is expressed by concatenating the direction vectors C1 and C2 as shown in Eq. 9.

$$C_1=[\exp(j\theta_{1m}), \exp(j\theta_{2m}), \exp(j\theta_{3m}), \exp(j\theta_{4m})]^T$$

$$C_2=[\exp(j\theta'_{1s}), \exp(j\theta'_{2s}), \exp(j\theta'_{3s}), \exp(j\theta'_{4s})]^T$$

$$C=[C_1, C_2] \qquad \text{[Equation 9]}$$

Then, as shown in Eq. 10, constraint vectors H1 and H2 are found. The constraint vector H1 is used for directing a reception beam in the direction toward the terminal of user 1 (the direction vector C1) and for forming a null point in the direction toward the terminal of user 2 (the direction vector C2). On the other hand, the constraint vector H2 is used for directing a reception beam in the direction toward the terminal of user 2 (the direction vector C2) and for forming a null point in the direction toward the terminal of user 1 (the direction vector C1).

$$H_1=[1\ 0]^T$$

$$H_2=[0\ 1]^T \qquad \text{[Equation 10]}$$

Subsequently, the direction vector C1, the matrix C and the constraint vector H1 are substituted into Eq. 11 to find a user separation weight W1. Further, the direction vector C2, the matrix C and the constraint vector H2 into Eq. 11 to find a user separation weight W2.

$$W_1=C(C^HC)^{-1}H_1^*$$

$$W_2=C(C^HC)^{-1}H_2^* \qquad \text{[Equation 11]}$$

Then, the user separation combining unit 140 separates a data sub-carrier signal transmitted by the terminal of user 1 from all data sub-carrier signals extracted by the fast Fourier transform units 70 to 73.

Let notation xi (l, k) represent the ith antenna, the lth valid symbol and the kth data sub-carrier signal. In this case, data sub-carrier signals extracted by the fast Fourier transform units 70 to 73 can be expressed as a matrix Z shown in Eq. 12.

$$Z = \begin{pmatrix} x_1(l,1) & x_1(l,2) & x_1(l,3) & x_1(l,4) \\ x_2(l,1) & x_2(l,2) & x_2(l,3) & x_2(l,4) \\ x_3(l,1) & x_3(l,2) & x_3(l,3) & x_3(l,4) \\ x_4(l,1) & x_4(l,2) & x_4(l,3) & x_4(l,4) \end{pmatrix} \quad \text{[Equation 12]}$$

As shown in Eq. 13, by multiplying the matrix Z by the user separation weight W1, it is possible to separate a data sub-carrier signal transmitted by the terminal of user 1 from all data sub-carrier signals extracted by the fast Fourier transform units 70 to 73. In the following description, the data sub-carrier signal transmitted by the terminal of user 1 is referred to as the data sub-carrier signal Y1.

$$Y1 = Z \times W1 \quad \text{[Equation 13]}$$

Similarly, as shown in Eq. 14, by multiplying the matrix Z by the user separation weight W2, it is possible to separate a data sub-carrier signal transmitted by the terminal of user 2 from all data sub-carrier signals extracted by the fast Fourier transform units 70 to 73. In the following description, the data sub-carrier signal transmitted by the terminal of user 2 is referred to as the data sub-carrier signal Y2.

$$Y2 = Z \times W2 \quad \text{[Equation 14]}$$

Next, in the demodulated data generation unit 111, the demodulation unit 1111 carries out a digital demodulation process on the data sub-carrier signal Y1. A signal obtained as a result of the digital demodulation process is subjected to a parallel-serial conversion process in the parallel-serial conversion unit 1112 to obtain demodulated data transmitted by the terminal of user 1. Similarly, the demodulated data generation unit 112 generates demodulated data transmitted by the terminal of user 2 in the same way as the demodulated data generation unit 111.

The following description explains an example of transmitting data to the terminals of users 1 and 2 by using respectively the user separation weights W1 and W2 obtained as described above.

In this case, the switches 20 to 23 connect respectively the antennas 10 to 13 to the transmitter 40. Thus, the antennas 10 to 13 are disconnected from the receiver 30. In this state of connection, the serial-parallel conversion unit 140 employed in the data generation unit 131 carries out a serial-parallel conversion process on data to be transmitted to the terminal of user 1 to generate a parallel signal as a result of the process.

Next, the modulation unit 141 carries out a digital conversion process on a parallel signal produced by the serial-parallel conversion unit 140 and the inverse Fourier transform unit 142 carries out an inverse Fourier transform process on a parallel signal completing the digital conversion process carried out by the modulation unit 141. The result of the inverse Fourier transform process is a transformed signal. In other words, the inverse Fourier transform unit 142 places the parallel signal completing the digital conversion process on the frequency axis to generate the transformed signal.

The parallel-serial conversion unit 143 carries out a parallel-serial conversion process on the transformed signal from the inverse Fourier transform unit 142 to generate a serial signal. Then, the guard interval insertion unit 144 inserts guard intervals into the serial signal from the parallel-serial conversion unit 143 to generate signals to be transmitted.

The multipliers 160 to 163 multiply the transmission signals produced by the guard interval insertion unit 144 by the user separation weight W1 to generate multiplied signals destined for the terminal of user 1.

The data generation unit 132 also generates multiplied signals destined for the terminal of user 2 on the basis of transmission signals for the terminal of user 2 and the user separation weight W2 in the same way as the data generation unit 131.

The adders 120 to 123 add the multiplied signals destined for the terminal of user 1 to the respective multiplied signals destined for the terminal of user 2 to generate sum signals which are output to their respective antennas 10 to 13 by way of the switches 20 to 23 respectively. The antennas 10 to 13 direct a transmission beam based on the sum signals for the terminal of user 1 to the terminal of user 1 and a transmission beam based on the sum signals for the terminal of user 2 to the terminal of user 2.

As described above, according to this embodiment, a weight W for carrying out a maximum ratio combining on data sub-carrier signals is found for each terminal and a direction vector is determined on the basis of the weight W for each terminal. Then, user separation vectors are found on the basis of these direction vectors. The separation vectors are used for well separating a data sub-carrier signal transmitted by a predetermined terminal from data sub-carrier signals transmitted by the terminals of all users.

As described above, in the first embodiment, the direction vector C1 toward the terminal of user 1 is found by eliminating an amplitude term from each element of the vector R, leaving only the phase term in the element. It is to be noted, however, the vector R itself can also be used as an alternative. This alternative technique can be applied to generation of direction vectors other than the direction vector toward the terminal of user 1, that is, generation of direction vectors other than the direction vector toward the terminals of users 2 to n.

(Second Embodiment)

In the embodiment described above, a direction vector is found on the basis of elements of column m corresponding to pmax for the weight W. However, the scope of the present invention is not limited to this technique. For example, the scope of the present invention includes the following technique.

The following description explains a technique adopted by the direction vector computation unit 810 to find a direction vector toward the terminal of user 1 on the basis of the weight W. It is to be noted that the following description assumes that column 3, one of the columns in the weight W, corresponds to a known sub-carrier signal transmitted by the terminal of user 1.

First of all, elements of columns 1 and 3 are extracted from the weight W. Then, an addition and averaging process is carried out on the elements of columns 1 and 3 for each row to generate a vector K shown in Eq. 15.

$$K = 1, 3 \quad \text{[Equation 15]}$$

-continued $$K = \begin{pmatrix} \sum_K \frac{h_1(k)}{|h_1(k)|^2} \\ \sum_K \frac{h_2(k)}{|h_2(k)|^2} \\ \sum_K \frac{h_3(k)}{|h_3(k)|^2} \\ \sum_K \frac{h_i(k)}{|h_i(k)|^2} \end{pmatrix} = \begin{pmatrix} B_1 \exp(j*\phi_1) \\ B_2 \exp(j*\phi_2) \\ B_3 \exp(j*\phi_3) \\ B_4 \exp(j*\phi_4) \end{pmatrix}$$

Then, the amplitude term of each of the elements of the vector K is eliminated from the element, leaving only the phase term in the element, to generate a vector T shown in Eq. 16. The vector T is used as a substitute for the direction vector C1 of the first embodiment toward the terminal of user 1. It is to be noted that the vector K itself can also be used as a direction vector.

$$T = \begin{pmatrix} \exp(j*\phi_1) \\ \exp(j*\phi_2) \\ \exp(j*\phi_3) \\ \exp(j*\phi_4) \end{pmatrix}$$ [Equation 16]

Furthermore, if elements of at least 3 columns of the weight W correspond to a known sub-carrier signal transmitted by the terminal of user 1, a direction vector can be found as follows.

Assume for example that the matrix of the weight W comprises at least 5 columns and columns a, b, c and d correspond to a known sub-carrier signal transmitted by the terminal of a predetermined user. In this case, the vector P' of the first embodiment can be expressed by Eq. 17.

$$P' = [p(a), p(b), p(c), p(d)]$$ [Equation 17]

The elements of the vector P' are rearranged in a decreasing order starting with the largest element. Assume for example that 2 elements are selected. In this way, it is possible to select 2 elements with highest degrees of reliability.

It is assumed that the elements are arranged as follows: p(a)>p(b)>p(c)>p(d). In this case, the elements p(a) and p(b) are selected. Thus, elements of columns a and b are extracted from the weight W. Then, an addition and averaging process is carried out on the elements of columns a and b for each row to generate a vector K.

What is claimed is:

1. A communication apparatus for receiving communication signals from terminals by adoption of an OFDM technique, in which each of the communication signals has a known signal including known sub-carrier signals placed along a frequency axis and a data signal including data sub-carrier signals placed along the frequency axis, and the known-sub-carrier signals received from any one of the terminals are placed along the frequency axis at positions different from positions of known-sub-carrier signals received from any other of the terminals, the communication apparatus comprising:
   antennas for receiving a communication signal from each of the terminals;
   Fourier transform means for carrying out a Fourier transform process on the known signal of the communication signal received from each of the terminals for each of the antennas, extracting the known sub-carrier signals from the communication signal, carrying out a Fourier transform process on the data signal of the communication signal received from each of the terminals for each of the antennas and extracting the data sub-carrier signals from the communication signal;
   inference means for inferring a propagation route inference value for each of the extracted known sub-carrier signals according to the known sub-carrier signals;
   a combining weight computation means for finding a combining weight used for carrying out a maximum ratio combining process on the data sub-carrier signals received by each of the antennas according to the inferred propagation route inference value for each of the terminals; and
   separation means for separating one of the data sub-carrier signals that has been transmitted by a predetermined one of the terminals from the data sub-carrier signals transmitted by all of the terminals and extracted by the Fourier transform means, according to the computed combining weight.

2. A communication apparatus adopting an OFDM technique according to claim 1, wherein the separation means includes:
   a direction vector computation means for computing a direction vector used for directing a reception beam in a direction toward the predetermined terminal according to the computed combining weight for each of the terminal;
   a separation weight computation means for finding a separation weight used for directing the reception beam toward the predetermined terminal on the basis of the direction vector found for each of the terminals and used for forming a null point in a direction toward any other one of the terminals; and
   a signal separation means for separating one of the data sub-carrier signals that has been transmitted by the predetermined terminal from the data sub-carrier signals transmitted by all of the terminals according to the computed separation weight.

3. A communication apparatus adopting an OFDM technique according to claim 2, wherein:
   the combining weight computation means finds a combining weight as a matrix corresponding to the antennas and the known sub-carrier signals; and
   the direction vector computation means finds a sum of magnitudes of the propagation route inference values for each of the known sub-carrier signals transmitted by the predetermined terminal, finds a maximum value among the sums, selects elements of the row of matrices corresponding to the maximum value and finds a direction vector on the basis of the selected elements.

4. A communication apparatus adopting an OFDM technique according to claim 3, wherein the direction vector computation means finds the direction vector as a vector represented by phase terms of the selected elements corresponding to the maximum value.

5. A communication apparatus adopting an OFDM technique according to claim 3, wherein the direction vector computation means finds the direction vector as a vector represented by phase and amplitude terms of the selected elements corresponding to the maximum value.

6. A communication apparatus adopting an OFDM technique according to claim 2, wherein:
   the combining weight computation means finds the combining weight as a matrix corresponding to the antennas and the known sub-carrier signals; and the direction vector computation means finds an average value of at least two elements of the matrix corresponding to the known sub-carrier signals transmitted by the predetermined terminal, and finds the direction vector according to the found average value.

7. A communication apparatus adopting an OFDM technique according to claim 6, wherein the direction vector computation means finds the direction vector as a vector represented by a phase term of the found average value.

8. A communication apparatus adopting an OFDM technique according to claim 6; wherein the direction vector computation means finds the direction vector as a vector represented by phase and amplitude terms of the found average value.

9. A communication apparatus adopting an OFDM technique according to claim 2, the communication apparatus further comprising:

a transmission data generation means for generating data to be transmitted for each of the terminals by placing transmission sub-carrier signals along the frequency axis; and output means provided for the antennas, respectively, and used for multiplying the data to be transmitted by the separation weight to generate products to be output to the respective antennas.

* * * * *